(12) United States Patent
Moriyama et al.

(10) Patent No.: US 7,611,201 B2
(45) Date of Patent: Nov. 3, 2009

(54) VEHICLE SEAT WITH MOVABLE CUSHION PORTION

(75) Inventors: Genta Moriyama, Anjo (JP); Masafumi Narita, Chita-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 269 days.

(21) Appl. No.: 11/636,591

(22) Filed: Dec. 11, 2006

(65) Prior Publication Data

US 2007/0132293 A1    Jun. 14, 2007

(30) Foreign Application Priority Data

Dec. 14, 2005    (JP) .............................. 2005-360003

(51) Int. Cl.
*B60N 2/02*    (2006.01)
(52) U.S. Cl. .................................. 297/337; 297/344.1
(58) Field of Classification Search ................ 297/337, 297/344.1, 317, 322
See application file for complete search history.

(56) References Cited

U.S. PATENT DOCUMENTS

| | | | | |
|---|---|---|---|---|
| 2,446,185 | A * | 8/1948 | Masucci et. al. ............. | 297/337 |
| 5,553,920 | A * | 9/1996 | Meschkat et al. ...... | 297/344.14 |
| 5,692,802 | A * | 12/1997 | Aufrere et al. ............... | 297/337 |
| 6,398,307 | B1 * | 6/2002 | Schmidt et al. ........ | 297/344.17 |
| 6,428,102 | B1 * | 8/2002 | Becker et al. ................ | 297/337 |
| 6,688,692 | B2 * | 2/2004 | Phillips et al. .............. | 297/337 |
| 6,767,062 | B2 * | 7/2004 | Piretti ......................... | 297/337 |
| 6,945,605 | B2 * | 9/2005 | Kinoshita et al. ........... | 297/317 |

FOREIGN PATENT DOCUMENTS

| | | | |
|---|---|---|---|
| DE | 196 24 979 | A1 * | 1/1998 |
| DE | 196 24 979 | C2 | 1/1998 |
| DE | 101 13 153 | C1 | 4/2002 |

* cited by examiner

*Primary Examiner*—David Dunn
*Assistant Examiner*—Tania Abraham
(74) *Attorney, Agent, or Firm*—Buchanan Ingersoll & Rooney PC (57) ABSTRACT

A vehicle seat includes a seat back portion, a cushion portion supported by a frame portion and provided to be movable, a supporting body included in the frame portion, a movable body included in the cushion portion and movable in the forward and backward direction, at least one guide wall provided at one of the supporting body and the movable body, and a sliding contact portion provided at the other one of the supporting body and the movable body and slidably movable, wherein the guide wall is formed, the sliding contact portion includes a main portion made of metal and a secondary portion deformed elastically, the secondary portion is interposed between the main portion and the guide wall and being in contact with the guide wall.

9 Claims, 7 Drawing Sheets

VEHICLE SEAT WITH MOVABLE CUSHION PORTION

CROSS REFERENCE TO RELATED APPLICATIONS

This application is based on and claims priority under 35 U.S.C §119 with respect to Japanese Patent Application 2005-360003, filed on Dec. 14, 2005, the entire content of which is incorporated herein by reference.

FIELD OF THE INVENTION

This invention relates to a vehicle seat. More particularly, this invention relates to a vehicle seat which includes a seat portion in which a cushion portion is supported by a frame portion and the cushion portion is provided so as to be movable in a forward and backward direction of a vehicle relative to the frame portion and a seat back portion.

BACKGROUND

In a seat configuration where a seat portion and a seat back portion are structured to be able to integrally adjust a position of the seat portion and the seat back in a forward and backward direction of a vehicle, longitudinal length of a cushion portion in the forward and backward direction of the vehicle is designed based on femoral length of human body. The femoral length of human body varies from individual to individual. However, the longitudinal length of the cushion portion is usually designed to fit with the relatively short femoral length. When the longitudinal length of the cushion portion is designed to fit with the relatively short femoral length, an occupant who has the relatively long femoral length is not able to attain satisfactory comfort to sit in a seat, because the backs of the occupant's knees stick out from the cushion portion in a forward direction.

In a configuration where a cushion portion is movable in a forward and backward direction of a vehicle relative to a frame portion of a seat portion, the cushion portion is movable in the forward and backward direction of the vehicle relative to a seat back portion. Thus, an occupant who has the relatively long femoral length is able to attain satisfactory comfort by moving a position of the cushion portion forward in a longitudinal direction relative to the seat back portion to place a front end side of the cushion portion under the backs of the occupant's knees.

In order to enable the cushion portion to move in the forward and backward direction of the vehicle relative to the frame portion of the seat portion, for example, a bush is interposed between the frame portion and the cushion portion as disclosed in German Patent 10113153 and German Patent 19624979. In the seat which is disclosed in German Patent 10113153, a moving member positioned in a cushion portion side is suspended to a securing member via the bush. The bush is inserted into a longitudinally elongated guide hole provided at the moving member. An elastic portion is provided at the bush. The elastic portion is used for avoiding a clearance between upper and lower guide walls of a guide hole and the bush, and the presence of the elastic portion allows the seat to restrict rattling between the moving member and the securing member.

In the seat disclosed in German Patent 19624979, a moving member positioned in a cushion portion side is suspended to a securing member via the bush. The bush is inserted into a longitudinally elongated guide hole provided at the moving member. An elastic portion is provided at the bush. The elastic portion restricts the rattling between the moving member and the securing member.

However, in German Patent 10113153 and German Patent 19624979, the bush is made of a single material. In order to provide the elastic portion at the bush which is made of a single material, for example, the entire portion of the bush is needed to be made of a resin. In that case, the resin may be severely degraded due to a load caused by weight of the occupant sitting on the seat and age-related degradation. When the degradation of the resin progresses seriously, the rattling occurs between the moving member and the securing member to lose the comfort to sit in the seat.

The present invention has been made in view of the above circumstances, and provides a vehicle seat improving comfort to sit in the seat by preventing the rattling between the cushion portion and the frame portion which movably supports the cushion portion in a forward and backward direction.

SUMMARY OF THE INVENTION

According to an aspect of the present invention, a vehicle seat includes a seat back portion, a cushion portion supported by a frame portion and provided to be movable in a forward and backward direction of a vehicle relative to the frame portion and the seat back portion, a supporting body included in the frame portion, a movable body included in the cushion portion and movable in the forward and backward direction of the vehicle relative to the supporting body, at least one guide wall provided at one of the supporting body and the movable body, and a sliding contact portion provided at the other one of the supporting body and the movable body and slidably movable relative to the guide wall, wherein the guide wall is formed so as to extend in the forward and backward direction of the vehicle, the sliding contact portion includes a main portion made of metal and a secondary portion which is more easily deformed elastically than the main portion, the secondary portion is interposed between the main portion and the guide wall and being in contact with the guide wall.

BRIEF DESCRIPTION OF THE DRAWINGS

The foregoing and additional features and characteristics of the present invention will become more apparent from the following detailed description considered with reference to the accompanying drawings, wherein:

FIG. 1 illustrates a first embodiment.

FIG. 7 illustrates another embodiment, FIG. 8 illustrate another embodiment.

DETAILED DESCRIPTION

An embodiment of the present invention will be described below with reference to the attached drawings FIG. 1 to FIG. 6. Hereinafter, a longitudinal direction indicates a forward and backward moving direction of a vehicle. A forward direction indicates a forward direction with respect to the moving direction of the vehicle and a backward direction indicates a backward direction with respect to the moving direction of the vehicle. Further, right indicates right with respect to the moving direction of the vehicle and left indicates left with respect to the moving direction of the vehicle. Top and bottom indicates a vertical direction with respect to the moving direction of the vehicle.

Figure 1A:
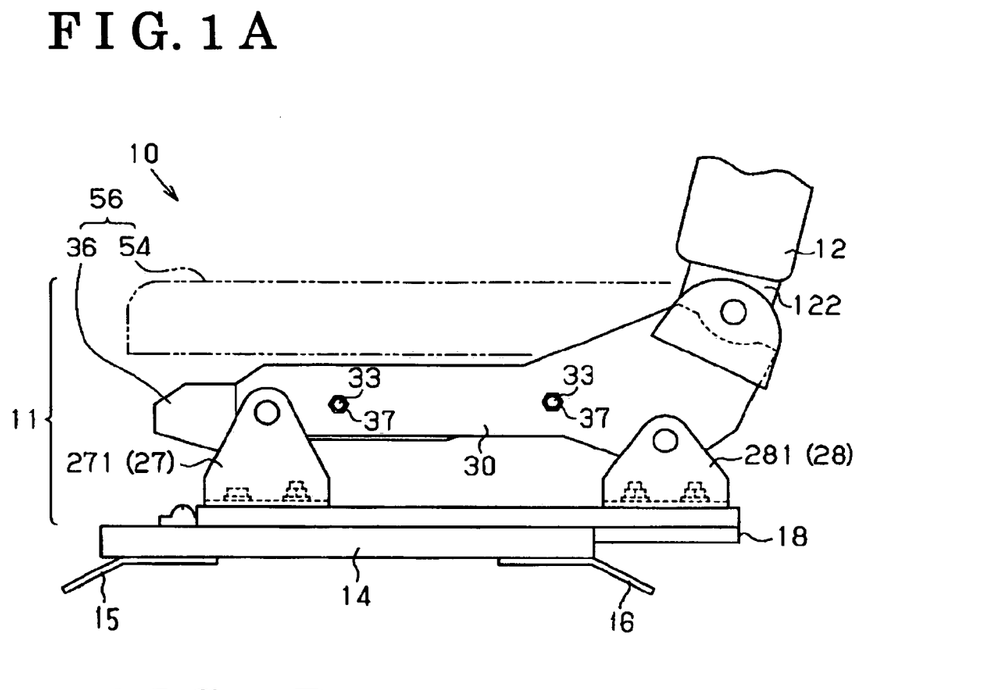
FIG. 1A is a side view and FIG. 1B is a plain cross sectional view.
Figure 1B:
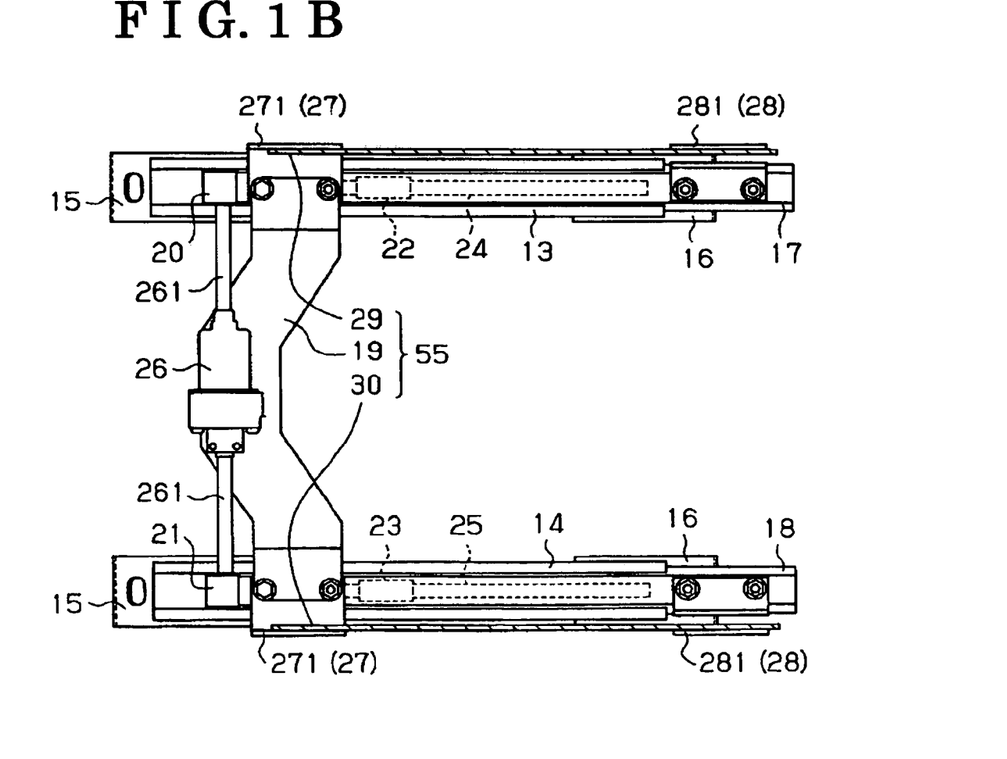

FIG. 1A illustrates a vehicle seat 10 having a seat portion 11 and a seat back portion 12. A pair of lower rails 13 and 14 (the lower rail 13 is illustrated in FIG. 1B) forms the seat portion 11. One of the lower rails 13 and 14 is fixed at a right portion and the other lower rail is fixed to a left portion of a vehicle floor. A pair of brackets 15 and 16 is longitudinally arranged. Each lower rail is fixed to the vehicle floor via the pair of brackets 15 and 16 so as to extend in a longitudinal direction.

As illustrated in FIG. 1B, upper rails 17 and 18 are slidably provided on the lower rails 13 and 14 in the longitudinal direction, respectively. A connecting bracket 19 is disposed between the upper rail 17 and the upper rail 18. A gear box 20 is provided at a front end portion of the upper rail 17 and a gear box 21 is provided at a front end portion of the upper rail 18. A deceleration gear mechanism (Not shown in the figure) is housed in the respective gear boxes 20 and 21. Nuts 22 and 23 are affixed to the lower rails 13 and 14 respectively, and threaded shafts 24 and 25 are threadedly engaged with the nuts 22 and 23 respectively. The threaded shafts 24 and 25 extend in the longitudinal direction. Furthermore, the threaded shaft 24 is rotatably supported by the upper rail 17 and the threaded shaft 25 is rotatably supported by the upper rail 18. A front end portion of the threaded shaft 24 is connected to the deceleration gear mechanism located in the gear box 20 and a front end portion of the threaded shaft 25 is connected to the deceleration gear mechanism located in the gear box 21.

A motor 26 is located on the connecting bracket 19. The motor 26 can rotate in a normal and a reverse direction. The rotation of an output shaft 261 of the motor 26 is connected to the deceleration gear mechanisms located in the gear boxes 20 and 21. The rotation of the output shaft 261 is transmitted to the threaded shafts 24 and 25 after being decelerated by the deceleration mechanisms. The threaded shafts 24 and 25 obtain a driving force from the motor 26 via the deceleration gear mechanisms and are synchronized to rotate in the normal or the reverse direction. When the threaded shafts 24 and 25, which are threadedly engaged with the corresponding nuts 22 and 23, rotate in the normal direction, the thread shafts 24 and 25, the gear boxes 20 and 21, the motor 26, the connecting bracket 19 and the upper rails 17 and 18 unitarily move forward relative to the lower rails 13 and 14. When the threaded shafts 24 and 25 rotate in the reverse direction, the thread shafts 24 and 25, the gear boxes 20 and 21, the motor 26, the connecting bracket 19 and the upper rails 17 and 18 unitarily move backward relative to the lower rails 13 and 14. In other words, the seat portion 11 and the seat back portion 12 unitarily move in the forward or backward direction relative to the lower rails 13 and 14 by rotation of the threaded shafts 24 and 25 in the normal direction or in the reverse direction.

As illustrated in FIGS. 1A and 1B, a pair of longitudinally arranged brackets 27 and 28, which is L shaped, is affixed to respective upper surfaces of the upper rails 17 and 18. Metal supporting bodies 29 and 30 are fixed to vertical portions 271 of the brackets 27 so as to extend in the longitudinal direction. Metal supporting bodies 29 and 30 are also fixed to vertical portions 281 of the brackets 28 so as to extend in the longitudinal direction. A left side frame 121 and a right side frame 122 structures the seat back portion 12. The left side frame 121 is tiltably supported by a rear end portion of the supporting body 29. The right side frame 122 is tiltably supported by a rear end portion of the supporting body 30. That is to say, the seat back portion 12 is supported by the supporting bodies 29 and 30 so as to be able to adjust the reclining angle of the seat back portion 12. A pair of the supporting bodies 29 and 30 and the connecting bracket 19 structure a frame portion 55 which is immovable in the forward and backward direction relative to the seat back portion 12.

Figure 3A:
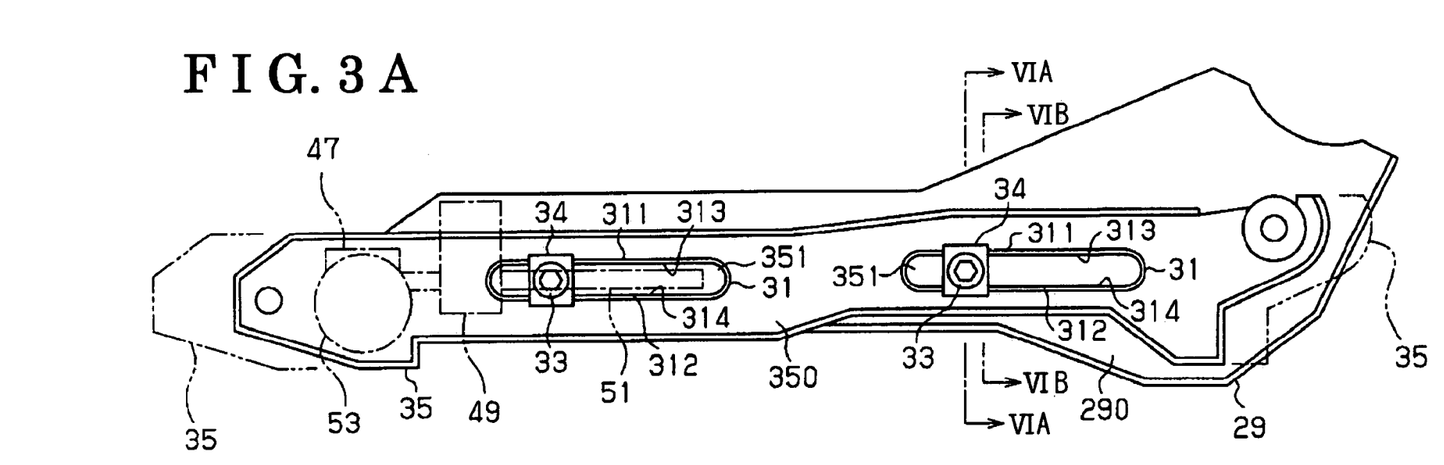
FIGS. 3A and 3B are inner surface views.
Figures 4A, 4B:
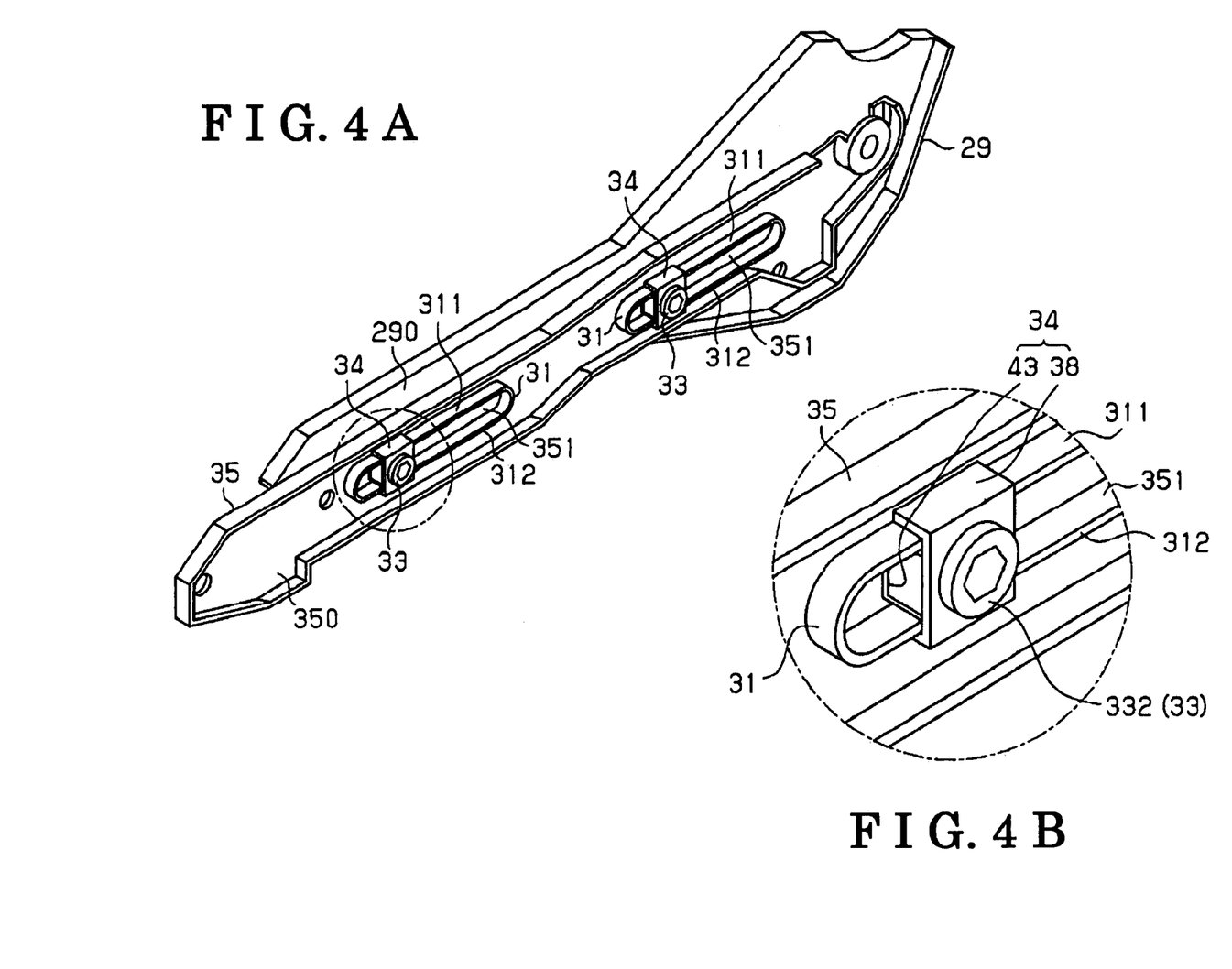
FIG. 4A is a perspective view and FIG. 4B is an enlarged fragmentary perspective view.

As illustrated in FIGS. 3A and 4A, a movable body 35 extends in the longitudinal direction and is supported via a pair of bolts 33 and a pair of sliding contact portions 34 so as to be movable in the longitudinal direction. A pair of annular projecting portions 31 is projected at a flat plate portion 350 of the movable body 35 and the inside of each annular projecting portion 31 is formed in a longitudinally extending guide hole 351. A hole forming wall 311 positioned at an upper side of each annular projecting portion 31 is in parallel with a hole forming wall 312 positioned at a lower side of each annular projecting portion 31. An opposing wall of each hole forming wall 311 (an upper hole forming wall of the guide holes 351. Hereinafter, the upper hole forming wall is referred to as a guide wall 313) is in parallel with an opposing wall of each hole forming wall 312 (a lower hole forming wall of the guide hole 351. Hereinafter, the lower hole forming wall is referred to as a guide wall 314)

Figure 3B:
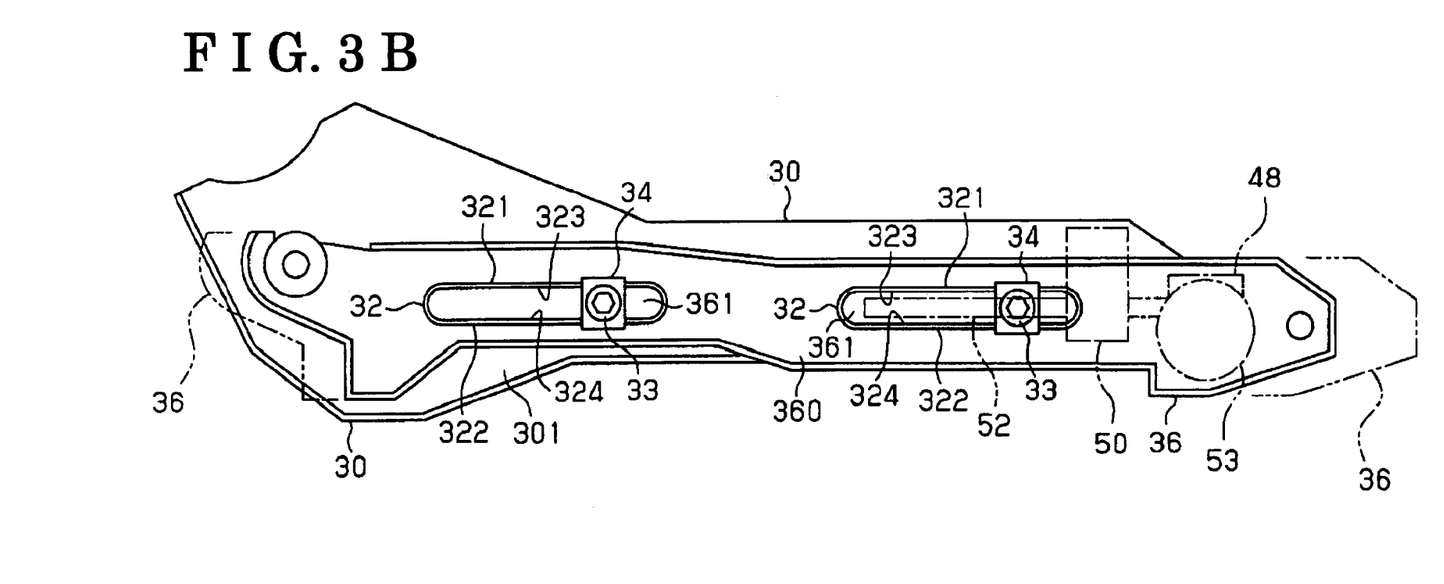

As illustrated in FIG. 3B, a movable body 36 extends in the longitudinal direction and is supported by the supporting body 30 via a pair of the bolts 33 and a pair of the sliding contact portions 34 so as to be movable in the longitudinal direction. A pair of annular projecting portions 32 is projected in a flat plate portion 360 of the movable body 36 and the inside of each annular projecting portion is formed in a longitudinally extending guide hole 361. A hole forming wall 321 positioned at an upper side of each annular projecting portion 32 is in parallel with a hole forming wall 322 positioned at a lower side of each annular projecting portion 32. An opposing wall of each hole forming wall 321 (an upper hole forming wall of the guide hole 361. Hereinafter, the upper hole forming wall is referred to as a guide wall 323) is in parallel with an opposing wall (a lower hole forming wall of the guide hole 361. Hereinafter, the lower hole forming wall is referred to as a guide wall 324) of the hole forming wall 322.

Figure 6A:
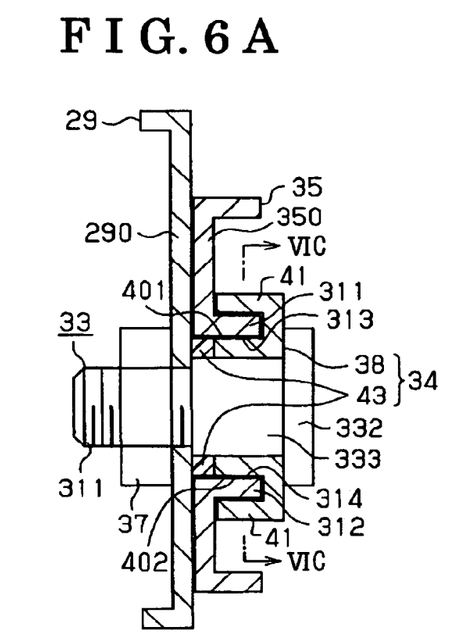
FIG. 6A is a cross sectional view taken along a line IVA-IVA of FIG. 3A.
Figure 6B:
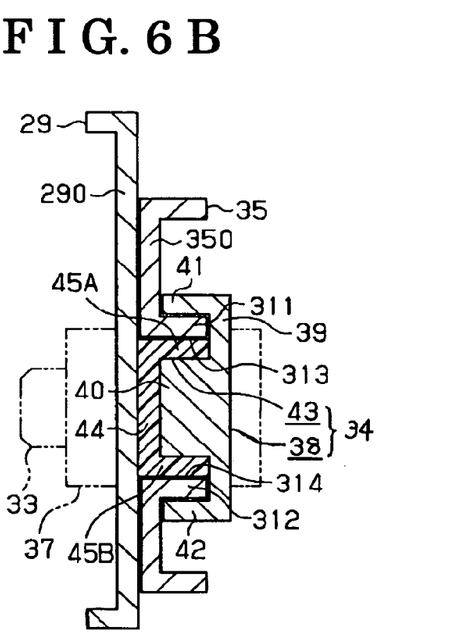
FIG. 6B is a cross sectional view taken along a line IVB-IVB of FIG. 3A
Figure 6C:
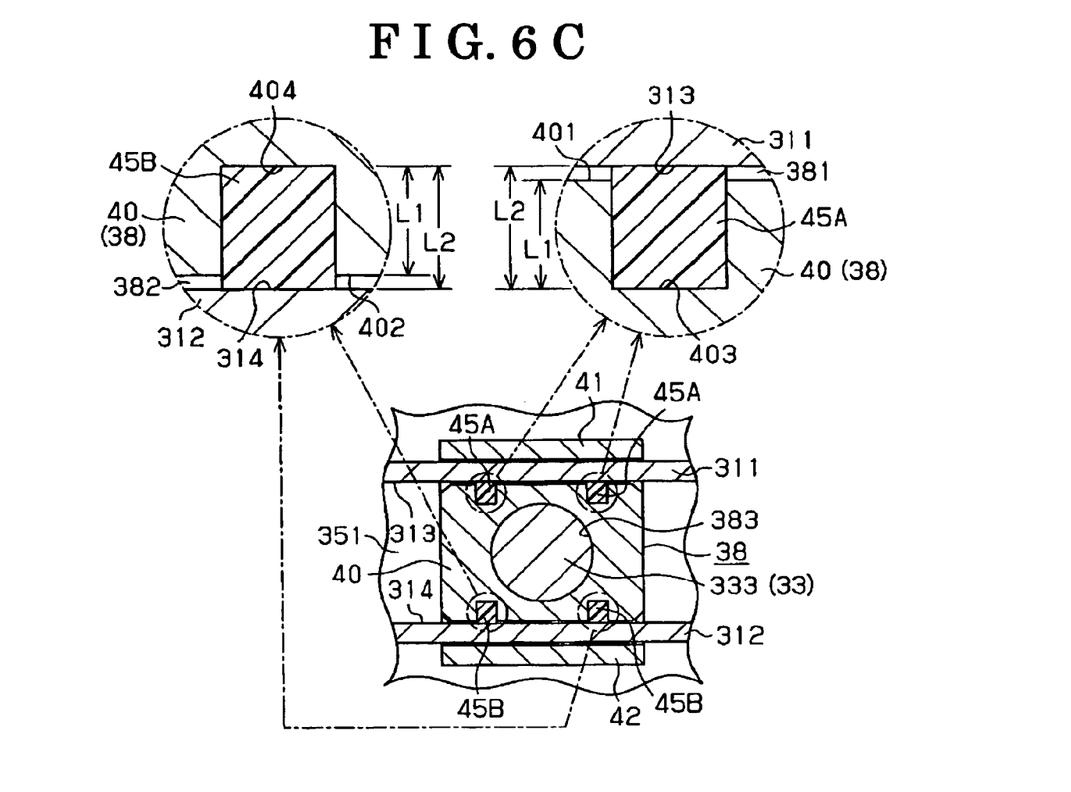
FIG. 6C is a cross sectional view taken along a line IV-IV of FIG. 6A.

As illustrated in FIGS. 6A and 6B, the bolt 33 is penetrated into the guide hole 351. A threaded portion 331 of the bolt 33 is penetrated into a flat plate portion 290 of the supporting body 29. A nut 37 is screwed onto the threaded portion 331 penetrating into the plate portion 290. A supporting portion 333 is formed between a bolt head 332 of the bolt 33 and the threaded portion 331, and the diameter of the supporting portion 333 is larger than that of the threaded portion 331. A stepped portion between the threaded portion 331 and the supporting portion 333 is pressed and contacted with the flat plate portion 290 of the supporting body 29. Thus, the bolt 33 is secured to the supporting body 29. The sliding contact portion 34 is engaged and supported by the supporting portion 333 of the bolt 33.

Figures 5A, 5B:
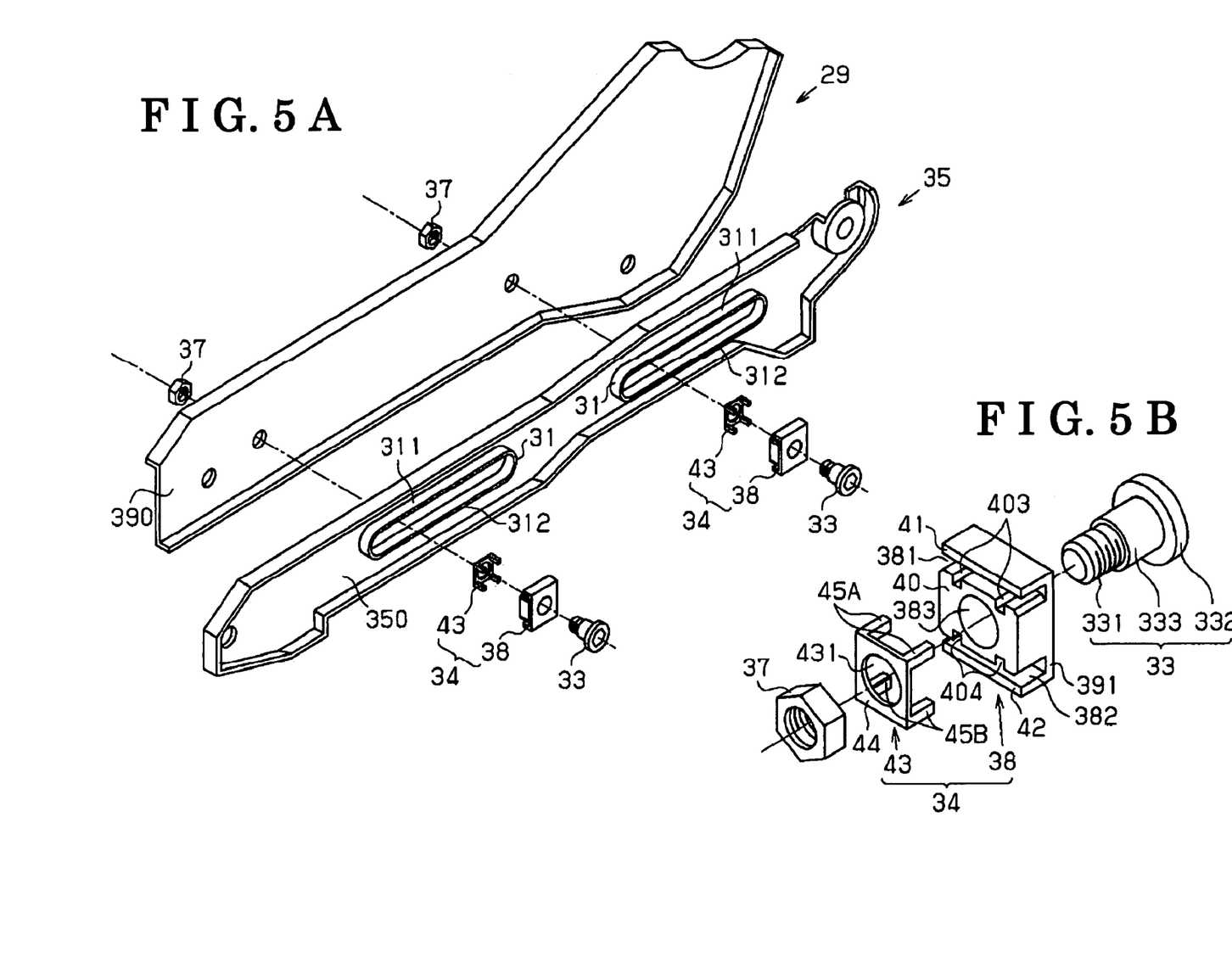
FIG. 5A is an exploded perspective view and FIG. 5B is an enlarged fragmentary exploded perspective view.

As illustrated in FIGS. 5A and 5B, the sliding contact portion 34 is provided with a main portion 38 and a secondary portion 43. The main portion 38 is made of a metal, for example an iron sintered body, and the secondary portion 43 is made of a synthetic resin which is elastically deformed more easily than the main portion 38. For the synthetic resin portion, for instance, polyacetal or nylon is employed. The main portion 38 is integrally formed by a quadrangular bottom portion 39, a quadrangular fitted portion 40, and groove forming walls 41 and 42. The fitted portion 40 projects from the bottom portion 39 and further projects from the movable body 35 side toward the supporting body 29 side. The groove forming wall 41 projects from an upper end portion of the bottom portion 39 and further projects from the movable body 35 side toward the supporting body 29 side. The groove forming wall 42 projects from a lower end portion of the bottom portion 39 and further projects from the movable body 35 side toward the supporting body 29 side. A guide groove 381 is formed between an upper end surface 401 of the fitted portion 40 and the groove forming wall 41. A guide groove 382 is formed between a lower end surface 402 of the fitted portion 40 and the groove forming wall 42. A pair of recessed portions 403 is recessed on the upper end surface 401 of the fitted portion 40 and a pair of recessed portions 404 is recessed on the lower end surface 402 of the fitted portion 40. Depths L1 of four recessed portions 403 and 404 (illustrated in FIG. 6C) are designed to be identical.

The secondary portion 43 is integrally formed with a quadrangular bottom portion 44 and projecting slide portions 45A and 45B. The projecting slide portions 45A and 45B are square-pole shaped and project from four corners of the bottom portion 44 and further project from the supporting body 29 side toward the movable body 35 side. Each of the two projecting slide portions 45A is fitted into each of the corresponding two recessed portions 403 and each of the two projecting slide portions 45b is fitted into each of the corresponding two recessed portions 404. Longitudinal thicknesses L2 (illustrated in FIG. 6C) of the projecting slide portions 45A and 45B are designed to be identical. The thicknesses L2 of the projecting slide portions 45A and 45B are slightly larger than the depths L1 of the recessed portions 403 and 404 (L2>L1). Widths (longitudinal lengths) of the recessed portions 403 and 404 are designed to be approximately identical to widths (longitudinal lengths) of the projecting slide portions 45A and 45B. Hence, the recessed portions 403 and 404 restrict relative movement of the projecting slide portions 45A and 45B of the secondary portion 43 in the longitudinal direction with respect to the main portion 38.

A through hole 383 is penetrated through the bottom portion 39 and the fitted portion 40 of the main portion 38. A through hole 431 is penetrated through the bottom portion 44 of the secondary portion 43. The supporting portion 333 of the bolt 33 penetrates into the through hole 383 of the main portion 38 and the through hole 431 of the secondary portion 43. When the bolt 33, which penetrates into the guide hole 351, is secured to the supporting body 29 being fastened with the nut 37, the hole forming wall 311 of each annular projecting portion 31 of the movable body 35 is inserted into the guide groove 381 and the hole forming wall 312 of each annular projecting portion 31 is inserted into the guide groove 382. Moreover, the projecting slide portions 45A of the secondary portion 43 contact the guide wall 313 of the annular projecting portion 31. The projecting portions 45B of the secondary portion 43 contact the guide wall 314 of the annular projecting portion 31. In other words, the sliding contact portion 34 is fitted into the guide hole 351 so that the sliding contact portion 34 is movable in the longitudinal direction in the guide hole 351, and the upper guide wall 313 and the lower guide wall 314 of the guide hole 351 contact the projecting slide portions 45A and 45B of the secondary portion 43 respectively. The projecting slide portions 45A are interposed between the fitted portion 40 of the main portion 38 and the upper guide wall 313 of the guide hole 351 in the guide hole 351 being press fitted thereinto. The projecting slide portions 45B are interposed between the fitted portion 40 of the main portion 38 and the lower guide wall 314 of the guide hole 351 in the guide hole 351 being press fitted thereinto. Thus, the projecting slide portions 45A are interposed between the fitted portion 40 of the main portion 38 and the upper guide wall 313 of the guide hole 351 in the guide hole 351 being with being elastically deformed. The projecting slide portions 45B are interposed between the fitted portion 40 of the main portion 38 and the lower guide wall 314 of the guide hole 351 in the guide hole 351 being elastically deformed.

The projecting slide portions 45A of the secondary portion 43, which are fitted into the recessed portions 403, project toward the inside of the guide groove 381 from the upper end surface 401 of the fitted portion 40. The projecting slide portions 45b of the secondary portion 43, which are fitted into the recessed portions 404, project toward the inside of the guide groove 382 from the lower end surface 402 of the fitted portion 40. In other words, the recessed portions 403 allow the projecting slide portions 45A and the guide wall 313 of the annular projecting portion 31 to contact each other and hold the projecting slide portions 45A to define a clearance between the upper end surface 401 of the fitted portion 40 and the guide wall 313. Further, the recessed portions 404 allow the projecting slide portions 45B and the guide wall 314 of the annular projecting portion 31 to contact each other and hold the projecting slide portions 45B to define a clearance between the lower end surface 402 of the fitted portion 40 and the guide wall 314.

The movable body 36 is supported by the supporting body 30 with the bolts 33 and the sliding contact portions 34. The supporting configuration is identical to that of the movable body 35 which is supported by the supporting body 29 with the bolts 33 and the sliding contact portions 34. A seat cushion 54 illustrated in FIG. 1A and FIG. 2 is supported by the movable bodies 35 and 36 via brackets which are not illustrated in the figures.

Figure 2:
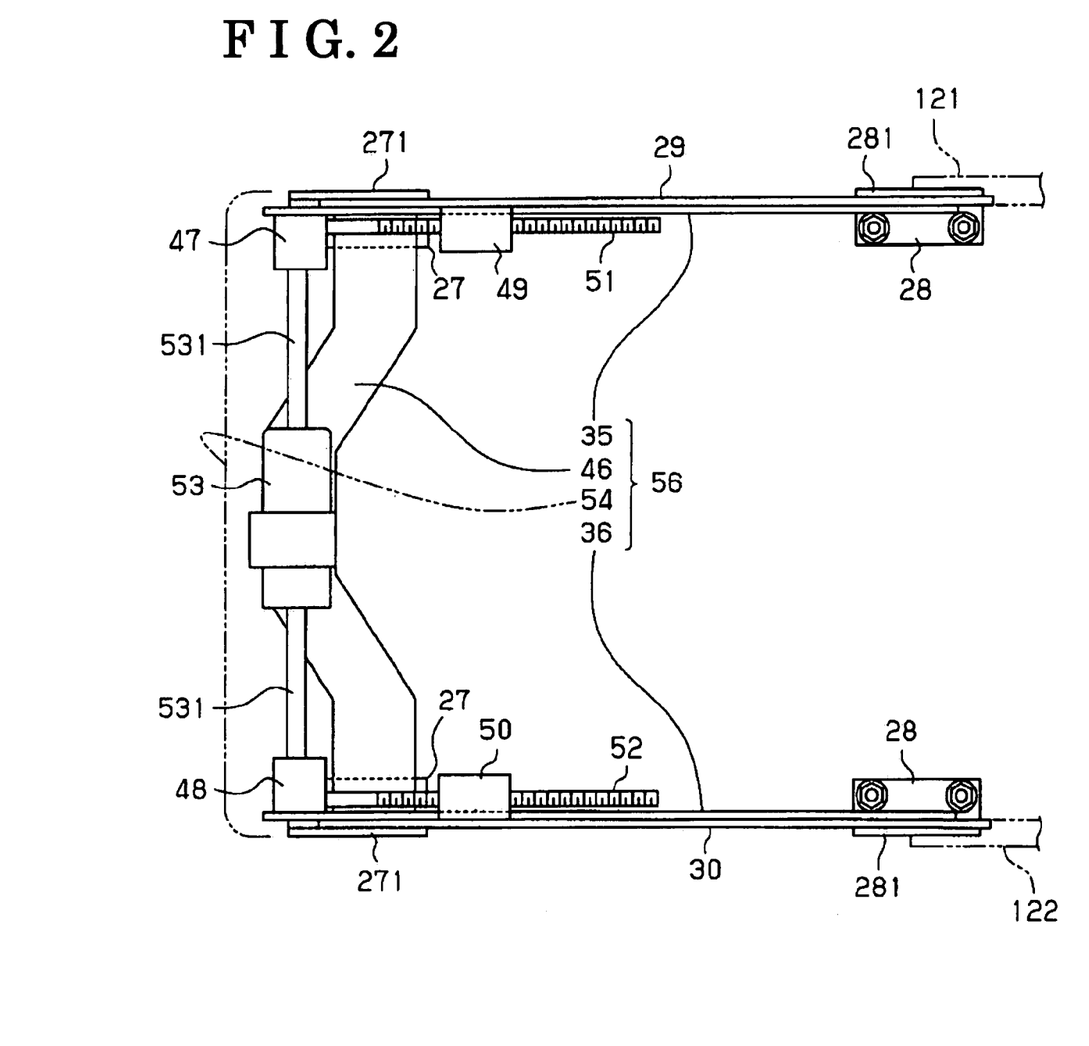
FIG. 2 is a plain view.

As illustrated in FIG. 2, a connecting bracket 46 is disposed between the movable bodies 35 and 36. A gear box 47 is provided at a front end portion of the movable body 35 and a gear box 48 is provided at a front end portion of the movable body 36. A deceleration gear mechanism (not shown in the figure) is housed in the respective gear boxes 47 and 48. Nuts 49 and 50 are affixed to the supporting bodies 29 and 30 respectively, and threaded shafts 51 and 52 are threadedly engaged with the nuts 49 and 50a respectively. The threaded shafts 51 and 52 extend in the longitudinal direction. Furthermore, the threaded shaft 51 is rotataby supported by the movable body 35 and the threaded shaft 52 is rotatably supported by the movable body 36. A front end portion of the threaded shaft 51 is connected to the deceleration gear mechanism located in the gear box 47 and a front end portion of the threaded shaft 52 is connected to the deceleration gear mechanism located in the gear box 48.

A motor 53 is located on the connecting bracket 46. The motor 53 can rotate in a normal and a reverse direction. The rotation of the output shaft 531 of the motor 53 is connected to the deceleration gear mechanisms located in the gear boxes 47 and 48. The rotational of the output shaft 531 is transmitted to the threaded shafts 51 and 52 after being decelerated by the deceleration mechanisms. The threaded shafts 51 and 52 obtain a driving force from the motor 53 via the deceleration mechanisms and are synchronized to rotate in the normal or the reverse direction. A mechanism is formed by the threaded shafts 51 and 52, the gear boxes 47 and 48, the motor 53, the connecting bracket 46 and the movable bodies 35 and 36, and is movably supported in the longitudinal direction by the nuts 49 and 50 and a plurality of the sliding contact portions 34 (four sliding contact portions 34 used in this embodiment).

The seat cushion 54, the connecting bracket 46 and the movable bodies 35 and 36 structure a cushion portion 56 which is supported by the frame portion 55. When the threaded shafts 51 and 52, which are threadedly engaged with the nuts 49 and 50 respectively, rotate in the normal direction, the thread shafts 51 and 52, the gear boxes 47 and 48, the motor 53, the connecting bracket 46 and the movable bodies 35 and 36 unitarily move forward relative to the supporting bodies 29 and 30. As shown in FIG. 3A, a position of the movable body 35 illustrated by a chain dash on the left side of the movable body 35 represents the position of movable body 35 after relatively moving forward from a position illustrated by a solid line. A position of the movable body 36 illustrated by a chain dash on the right side of the movable body 36, shown in FIG. 3B, represents the position of the movable body 36 after relatively moving forward from a position illustrated by a solid line. In other words, the seat cushion 54 supported by the supporting bodies 29 and 30 moves forward relative to the seat back portion 12. When the threaded shafts 51 and 52 rotate in the reverse direction, the thread shafts 51 and 52, the gear boxes 47 and 48, the motor 53, the connecting bracket 46 and the movable bodies 35 and 36 unitarily move backward relative to the supporting bodies 29 and 30. As shown in FIG. 3A, a position of the movable body 35 illustrated by a chain dash on the right side of the movable body 35 represents the position of movable body 35 after relatively moving backward from a position illustrated by a solid line. A position of the movable body 36 illustrated by a chain dash on the left side of the movable body 36, shown in FIG. 3B, represents the position of the movable body 36 after relatively moving backward from a position illustrated by a solid line. In other words, the seat cushion 54 supported by the supporting bodies 29 and 30 moves backward relative to the seat back portion 12.

The longitudinal movement of the movable body 35 relative to the supporting body 29 is guided by sliding contacts between the guide walls 313 and the projecting slide portions 45A of the secondary portions 43 and also guided by sliding contacts between the guide walls 314 and the projecting slide portions 45B of the secondary portions 43. The longitudinal movement of the movable body 36 relative to the supporting body 30 is guided by sliding contacts between the guide walls 323 and the projecting slide portions 45A of the secondary portions 43 and also guided by sliding contacts between the guide walls 324 and the projecting slide portions 45B of the secondary portions 43.

According to the first embodiment, the following effects can be obtained.

(1) The projecting slide portions 45A and 45B of the secondary portion 43 are made of a synthetic resin. The projecting slide portions 45A are interposed between the fitted portion 40 of the main portion 38 and the guide wall 313 of the guide hole 351 and the projecting slide portions 45B are interposed between the fitted portion 40 of the main portion 38 and the guide wall 314 of the guide hole 351 with the projecting slide portions 45A and 45B elastically deformed in the guide hole 351. Further, the projecting slide portions 45A are interposed between the fitted portion 40 and the guide wall 323 of the guide hole 361 and the projecting slide portions 45B of the secondary portion 43 are interposed between the fitted portion 40 and the guide wall 324 of the guide hole 361 with the projecting slide portions 45A and 45B elastically deformed in the guide hole 361. Additionally, the projecting slide portions 45A contact the guide walls 313 and 323 and the projecting slide portions 45B contact the guide walls 314 and 324. In other words, clearances between the fitted portion 40 of the main portion 38 and the respective guide walls 313 and 323 are filled by the projecting slide portions 45A which are made of a synthetic resin. Also, clearances between the fitted portion 40 of the main portion 38 and the respective guide walls 314 and 324 are filled by the projecting slide portions 45B. Therefore, the rattling is unlikely to occur between the supporting body 29 and the movable body 35 or between the supporting body 30 and the movable body 36.

In order to enable the metal main portion 38 to move along the guide walls 313,314 in the guide hole 351, or move along 323 and 324 in the guide hole 361, clearances are needed to be defined between the fitted portions 40 of the main portions 38 and the respective guide walls 313,314,323, and 324 in consideration of manufacturing errors. Usually, the clearances are small, and the secondary portions 43 are interposed between the main portions 38 and the respective guide walls 313,314,323 and 324 so as to fill the clearances. In other words, difference (L2−L1) between the depths L1 of the recessed portions 403 and the thicknesses L2 of the projecting slide portions 45A and 45B is approximately identical to each clearance between the upper end portion 401 of the fitted portion 40 and the respective upper guide walls 313 and 323 of the guide holes 351 and 361. The difference is also approximately identical to each clearance between the lower end portion 402 of the fitted portion 40 and the respective lower guide walls 314 and 324 of the guide hole 351 and 361.

Even if the projecting slide portions 45A and 45B of the secondary portion 43 are abraded away on the side where the projecting slide portions 45A and 45B contact the respective guide walls 313,314,323 and 324, and the abrasion loss is equivalent to the clearance [=(L2−L1)], the fitted portion 40 of the main portions 38 comes in contact with the respective guide walls 313,314,323, and 324. Thus, the rattling is unlikely to occur between the supporting body 29 and the movable body 35 and between the supporting body 30 and the movable body 36.

(2) The projecting slide portions 45B of the secondary portion 43 contact the lower guide wall 314 of the guide hole 351 and the lower guide wall 324 of the guide hole 361. Weight of the occupant sitting on the seat cushion 54 is received by the supporting bodies 29 and 30 entirely via the projecting slide portions 45B. Thus, when the cushion portion 56 is moved in the longitudinal direction relative to the seat back portion 12 with the occupant sitting thereon, the projecting slide portions 45b slidably contact the guide walls 314 and 324 receiving a large load caused by the weight of the occupant sitting on the seat cushion 54. Synthetic resin (Particularly, polyacetal) is excellent in sliding property. Therefore, a configuration where the projecting slide portions 45B, which are made of a synthetic resin, slidably contact the lower guide walls 314 and 324 is effective in moving the movable bodies 35 and 36 smoothly relative to the supporting bodies 29 and 30.

(3) The projecting slide portions 45A of the secondary portion 43 contact the upper guide wall 313 of the guide hole 351 and the upper guide wall 323 of the guide hole 361. A configuration where the projecting slide portions 45A of the secondary portion 43 contact the upper guide walls 313 and 323 is effective in ensuring the prevention of the rattling between the supporting body 29 and the movable body 35 and between the supporting body 30 and the movable body 36.

(4) The larger volume of the projecting slide portions 45A and 45B can enhance strength of the projecting slide portions 45A and 45B and restrict degradation of the projecting slide portions 45A and 45B due to age-related degradation more easily. A configuration where the projecting slide portions 45A are hold by the recessed portions 403 so as to define clearances between the upper end surface 401 of the fitted portion 40 and the respective guide walls 313 and 323 is preferred for obtaining the larger volume of the projecting slide portions 45A and improving formability of the secondary portion. Similarly, a configuration where the projecting slide portions 45B are hold by the recessed portions 404 to define clearances between the lower end surface 402 of the fitted portion 40 and the respective guide walls 314 and 324 is preferred for obtaining the larger volume of the projecting slide portions 45B and improving formability of the secondary portion.

(5) A configuration where the secondary portions 43 are made of a synthetic resin is particularly preferred for pressing the projecting slide portions 45A to contact the guide walls 313 and 323, pressing the projecting slide portions 45B to contact the guide walls 314 and 324 and enabling the smooth slide of the movable bodies 35 and 36 relative to the sliding contact portion 34. A configuration where the secondary portions 43 are made of polyacetal is preferred for enabling the smooth slide of the movable bodies 35 and 36 relatively to the sliding contact portion 34.

(6) A configuration where the secondary portion 43 is integrally formed by the bottom portion 44 and the projecting slide portions 45A and 45B is preferred for easy manufacturing and easy handling of the secondary portions 43. In this invention, the following embodiments may be implemented.

Figures 7A, 7B:
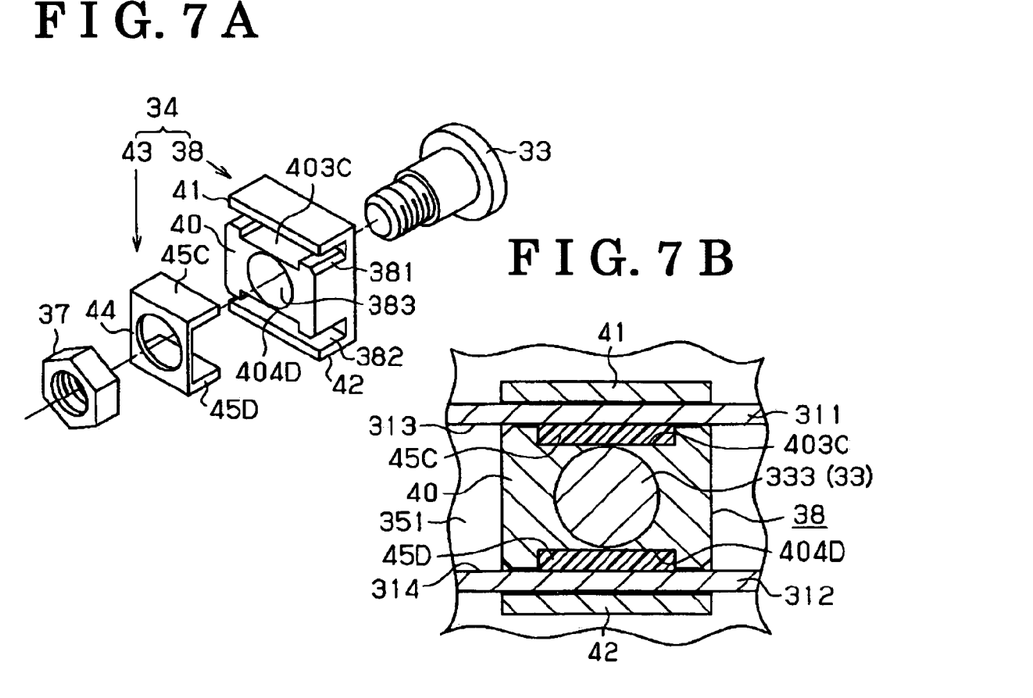
FIG. 7A is an exploded perspective view and FIG. 7B is a cross sectional view.

As illustrated in FIGS. 7A and 7B, a single projecting slide portion 45C may be provided at the upper side of the secondary portion 43 and a single projecting slide portion 45D may be provided at the lower side of the secondary portion 43. The projecting slide portion 45C may be fitted with a single upper recessed portion 403C formed in the fitted portion 40 and the projecting slide portion 45D may be fitted with a single lower recessed portion 404D formed in the fitted portion 40.

Figures 8A, 8B:
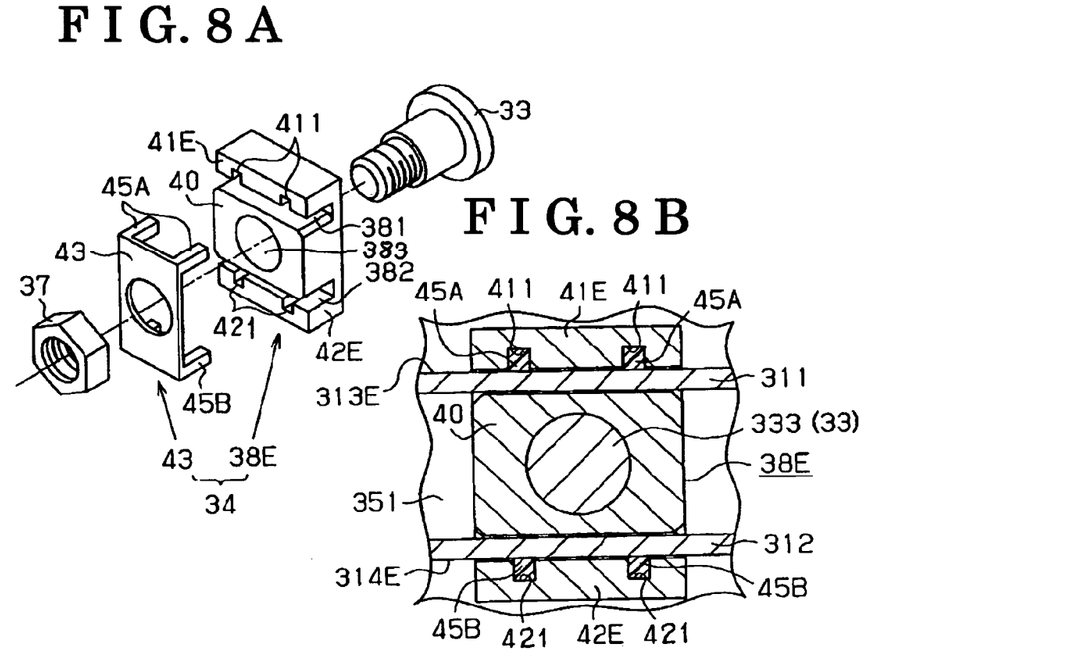
FIG. 8A is an exploded perspective view and FIG. 8B is a cross sectional view.

As illustrated in FIGS. 8A and 8B, an upper surface of the hole forming wall 311 of the annular projecting portion 31 may be served as a guide wall 313E and a lower surface of the hole forming wall 312 may be served as a guide wall 314E. The projecting slide portions 45A of the secondary portion 43 may be slidably contacted with the guide wall 313E and the projecting slide portions 45B of the secondary portion 43 may be slidably contacted with the guide wall 314E. The projecting slide portions 45A are fitted into recessed portions 411 recessed on a lower surface of a groove forming wall 41E and the projecting slide portions 45B are fitted into recessed portions 421 recessed on an upper surface of a groove forming wall 42E. In this case, the projecting slide portions 45A are interposed between the upper groove forming wall 41E of a main portion 38E and the guide wall 313E and the projecting slide portions 45B are interposed between the lower groove forming wall 42E of the main portion 38E and the guide wall 314E.

In the first embodiment, three or more recessed portions 403 may be formed on the upper end surfaces 401 of the fitted portion 40 and three or more recessed portions 404 may be formed on the lower end surface 402 of the fitted portion 40. In other words, three or more the projecting slide portions 45A may be formed and three or more projecting slide portions 45B may be formed.

In the first embodiment, the projecting slide portions 45A and the recessed portions 403 may be eliminated.

In the first embodiment, the projecting slide portions 45B and the recessed portions 404 may be eliminated.

In the first embodiment, the bottom portion 44 of the secondary portion 43 may be eliminated to form the four projecting slide portions 45a and 45b as individual components.

In the first embodiment, the main portion 38 may be formed as an inserting member and the secondary portion 43 may be molded accordingly.

In the first embodiment, the secondary portion 43 may be made of an elastic body. In this case, the projecting slide portions 45A and 45B may be formed with plate springs or made of rubber.

The annual projecting portions 31 and 32 and the guide holes 351 and 361 may be provided at the supporting bodies 29 and 30 sides and the sliding contact portions 34 may be affixed to the movable bodies 351 and 361 sides. Technical ideas which are obtained from the aforementioned embodiment described above are described as follows.

[1] A vehicle seat includes a seat portion supporting a cushion portion by a frame portion, the cushion portion provided so as to be relatively movable in a forward and backward direction of a vehicle relative to the frame portion and a seat back portion, a supporting body being part of the frame portion, a movable body being part of the cushion portion and movable in the forward and backward direction of the vehicle relative to the supporting body, guide walls provided at an upper side and a lower side of a guide hole on either one side of the supporting body and the movable body; and a sliding contact portion provided at the other one of the supporting body and the movable body where the guide walls are formed and being slidably movable relative to the guide walls, wherein the guide walls are formed so as to extend in the forward and backward direction of the vehicle, the sliding contact portion is constructed by a main portion and a secondary portion, the main portion is made of metal and the secondary portion is more easily deformed elastically than the main portion, the secondary portion is interposed between the main portion and one of the guide walls and also interposed between the main portion and the other one of the guide walls and contacts at least the one of the guide walls, each of the multiple secondary portions has the bottom portion and a plurality of the projecting slide portions which are integrally formed in the bottom portion, and the projecting slide portions are fitted into the recessed portions. The production of the secondary portion is facilitated, and the handling of the secondary portion is facilitated.

[2] The secondary portion may contact the lower guide wall of the guide hole. The configuration where the secondary portion contacts the lower guide wall is effective in moving the movable body smoothly relative to the supporting body.

[3] The secondary portion contacts the upper and lower guide walls. The configuration where the secondary portion contacts the upper guide wall is effective in ensuring the prevention of the rattling between the supporting bodies and the movable bodies.

According to the above description, it is possible to supply the vehicle seat improving comfort to sit in the seat by preventing the rattling between the cushion portion and the frame portion which movably supports the cushion portion in a forward and backward direction.

The secondary portion is interposed between the main portion and the guide walls. In other words, the clearances defined between the main portion and the guide walls are filled by the secondary portion which is elastically deformed more easily than the main portion. Accordingly, the rattling is not caused between the supporting body and the movable body.

It is preferred that the secondary portion is fitted into the recessed portions which are formed in the main portion. The presence of the recessed portion is preferred for obtaining the volume of the secondary portion interposed between the main portion and the guide walls and improving formability of the secondary portion.

The secondary portion is interposed between the main portion and the guide walls of each guide hole and contacts the guide walls. In other words, the clearances between the main portion and the guide walls are filled with the secondary portion. Therefore, the rattling is not caused between the supporting body and the movable body.

It is further preferred that the secondary portion is made of one of a resin and an elastic body. In the configuration where the secondary portion is made of a resin or an elastic body is preferred in pressing the secondary potion to contact the guide wall and enabling the smooth sliding between the slide contact portion and the movable body.

It is still further preferred that the secondary portion is interposed between the main portion and the guide walls being elastically deformed. The vehicle seat can ensure the prevention of the rattling between the supporting body and the movable body.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A vehicle seat, comprising:
   a seat back portion;
   a cushion portion supported by a frame portion and provided to be movable in a forward and backward direction of a vehicle relative to the frame portion and the seat back portion;
   a supporting body included in the frame portion;
   a movable body included in the cushion portion and movable in the forward and backward direction of the vehicle relative to the supporting body;
   an upper guide wall provided at one of the supporting body and the movable body and extending in the forward and backward direction of the vehicle;
   a lower guide wall provided at a lower side of the upper guide wall and extending in the forward and backward direction of the vehicle;
   a sliding contact portion provided at the other one of the supporting body and the movable body and slidably movable relative to the upper and lower guide walls, the sliding contact portion including a main portion made of metal and a secondary portion which is more easily deformed elastically than the main portion;
   an entirety of the secondary portion is provided within a space defined between the upper and lower guide walls and interposed between the main portion and the upper and lower guide walls to an elastically deformed state;
   wherein the secondary portion includes a projecting slide portion fitted into a recessed portion formed at the main portion; wherein
   the main portion includes a fitted portion, a wall portion and a guide groove, the guide groove being between an end surface of the fitted portion and the wall portion, one of the upper and lower guide walls being positioned in the guide groove,
   the recessed portion of the main portion is formed at the end surface of the fitted portion so as to be continuous with the guide groove, and
   the projecting slide portion of the secondary portion is interposed between the fitted portion of the main portion and the one of the upper and lower guide walls when fitted into the recessed portion formed at the main portion.

2. A vehicle seat according to claim 1, wherein
   a guide hole is provided at the one of the supporting body and is defined by the upper guide wall and the lower guide wall,
   the sliding contact portion is fitted into the guide hole to be movable in the forward and backward direction within the guide hole, and
   at least one of the upper and lower guide walls is in contact with the secondary portion of the sliding contact portion.

3. A vehicle seat according to claim 1, wherein the secondary portion is made of one of a resin and an elastic body.

4. A vehicle seat according to claim 1, wherein a thickness of the projecting slide portion is larger in an upper-lower direction of the upper and lower guide walls than a depth of the recessed portion.

5. A vehicle seat comprising:
   a seat back portion;
   a frame portion supporting a cushion portion, the cushion portion being movable in a forward and backward direction of a vehicle relative to the frame portion and the seat back portion;
   the frame portion comprising a supporting body;
   the cushion portion comprising a movable body that is movable relative to the supporting body in the forward and backward direction of the vehicle;
   an elongated guide hole extending completely through one of the supporting body and the movable body and extending in the forward and backward direction of the vehicle;
   a sliding contact portion provided at the other one of the supporting body and the movable body and slidably movable relative to the elongated guide hole, the sliding contact portion comprising a main portion and a secondary portion, the main portion being made of metal, the secondary portion being made of a material different from material of which the main portion is made, the secondary portion being more easily elastically deformed than the main portion;
   the secondary portion being positioned in its entirety within the guide hole in an elastically deformed state;
   wherein the secondary portion includes a projecting portion fitted into a recessed portion of the main portion;
   wherein the main portion comprises a fitted portion, a wall portion and a guide groove, the guide groove being between an end surface of the fitted portion and the wall portion; and
   wherein the fitted portion of the main portion comprises a recessed portion at the end surface of the fitted portion so as to be continuous with the guide groove.

6. A vehicle seat according to claim 5, wherein the secondary portion includes a plurality of spaced apart projecting portions positioned in a recessed portion in the main portion.

7. A vehicle seat according to claim 5, wherein the guide groove possesses an inner periphery, and a guide wall extending along one portion of the guide groove, the main portion possessing the guide groove in which the guide wall is positioned.

8. A vehicle seat according to claim 5, wherein the secondary portion is made of a resin or an elastic material.

9. A vehicle seat according to claim 5, wherein the projecting portion of the secondary portion is interposed between the fitted portion of the main portion and a guide wall along one side of the guide groove when fitted into the recessed portion formed at the main portion.

* * * * *